US011331867B2

(12) United States Patent
Gintert et al.

(10) Patent No.: US 11,331,867 B2
(45) Date of Patent: May 17, 2022

(54) NESTED MANUFACTURING OF COMPOSITE STRUCTURES

(71) Applicant: Textron Aviation Inc., Wichita, KS (US)

(72) Inventors: Lawrence Arthur Gintert, Andover, KS (US); Isaac William Nelson, Wichita, KS (US); Herbert Lee Skidmore, Viola, KS (US); Michael Preston McKown, Wichita, KS (US); Larry Gene Stephens, Derby, KS (US)

(73) Assignee: Textron Innovations, Inc., Providence, RI (US)

(*) Notice: Subject to any disclaimer, the term of this patent is extended or adjusted under 35 U.S.C. 154(b) by 352 days.

(21) Appl. No.: 15/683,957

(22) Filed: Aug. 23, 2017

(65) Prior Publication Data

US 2018/0056611 A1      Mar. 1, 2018

Related U.S. Application Data

(60) Provisional application No. 62/378,317, filed on Aug. 23, 2016.

(51) Int. Cl.
*B29C 70/54*      (2006.01)
*B29C 70/38*      (2006.01)
(Continued)

(52) U.S. Cl.
CPC .......... *B29C 70/541* (2013.01); *B29C 33/306* (2013.01); *B29C 70/32* (2013.01);
(Continued)

(58) Field of Classification Search
CPC ..... B29C 33/48; B29C 70/386; B29C 70/541; B29C 70/342
See application file for complete search history.

(56) References Cited

U.S. PATENT DOCUMENTS 1,001,500 A * 8/1911 Blayney ................ E04G 15/063
                                                      249/177
2,503,431 A * 4/1950 Bender .................. B21D 53/78
                                                      269/48.1

(Continued)

OTHER PUBLICATIONS

Kim, G.-H., J.-H. Choi, J.-H. Kweon, Manufacture and performance evaluation of the composite hat-stiffened panel, Composite Structures, vol. 92 (2010), pp. 2276-2284. (Year: 2010).*

*Primary Examiner* — Matthew J Daniels
(74) *Attorney, Agent, or Firm* — Erise IP, P.A.

(57) ABSTRACT

A manufacturing tool for forming composite structures includes at least one interchangeable mold template having a plurality of incorporated part shapes, and a backbone that connects to and supports the at least one interchangeable mold template during a process of laying up prepreg composite material to form a plurality of three-dimensional structures corresponding to the plurality of incorporated part shapes. A method for simultaneous manufacture of a plurality of composite structures includes providing an interchangeable mold template having a plurality of three-dimensional part shapes, fastening the interchangeable mold template to a backbone structure, laying up prepreg material over the interchangeable mold template to form a material layer, repeating laying up prepreg material to form a plurality of material layers each having a predetermined fiber orientation, and curing the plurality of material layers on the interchangeable mold template to form a plurality of structures corresponding to the three-dimensional part shapes.

10 Claims, 12 Drawing Sheets

(51) Int. Cl.
  B29C 70/34 (2006.01)
  B29C 70/32 (2006.01)
  B29C 33/30 (2006.01)
  B29K 105/08 (2006.01)
  B29K 63/00 (2006.01)
  B29K 309/08 (2006.01)
  B29C 33/42 (2006.01)

(52) U.S. Cl.
  CPC .......... B29C 70/342 (2013.01); B29C 70/386 (2013.01); B29C 70/54 (2013.01); B29C 33/42 (2013.01); B29K 2063/00 (2013.01); B29K 2105/0881 (2013.01); B29K 2309/08 (2013.01)

(56) References Cited

U.S. PATENT DOCUMENTS

| | | | | |
|---|---|---|---|---|
| 3,220,910 | A * | 11/1965 | Walkey | B29C 53/602 156/425 |
| 4,053,667 | A * | 10/1977 | Smith | B29C 70/342 428/116 |
| 4,448,628 | A * | 5/1984 | Stott | B29C 53/824 156/425 |
| 4,581,086 | A * | 4/1986 | Gill | B29C 53/845 156/425 |
| 4,633,632 | A * | 1/1987 | Sarh | B21J 15/142 52/245 |
| 5,022,845 | A * | 6/1991 | Charlson | B29C 33/30 156/425 |
| 5,223,067 | A * | 6/1993 | Hamamoto | B29C 53/805 156/173 |
| 6,572,356 | B2 | 6/2003 | Seger | |
| 6,613,258 | B1 * | 9/2003 | Maison | B29C 65/7882 264/102 |
| 7,249,943 | B2 * | 7/2007 | Benson | B29C 70/504 425/403 |
| 7,597,772 | B2 * | 10/2009 | Martinez Cerezo | B29C 70/34 156/169 |
| 7,993,123 | B2 | 8/2011 | Wigand et al. | |
| 8,307,872 | B2 | 11/2012 | Kendall et al. | |
| 2008/0065259 | A1 * | 3/2008 | Dietrich | G05B 19/4099 700/182 |
| 2010/0000667 | A1 * | 1/2010 | Funnell | B29D 99/0014 156/189 |
| 2015/0147421 | A1 | 5/2015 | Te et al. | |
| 2016/0075092 | A1 * | 3/2016 | Wilcoxson | B64C 1/064 156/222 |

* cited by examiner

NESTED MANUFACTURING OF COMPOSITE STRUCTURES

CROSS-REFERENCE TO RELATED APPLICATIONS

This application claims the benefit of U.S. Provisional Application No. 62/378,317 entitled "Nested Manufacturing of Composite Structures" filed on Aug. 23, 2016, which is herein incorporated by reference in its entirety.

BACKGROUND

1. Field

Embodiments of this disclosure relate generally to tools and processes for manufacturing parts, and more specifically to tools and processes for simultaneously forming multiple composite structures.

2. Description of the Related Art

U.S. Patent Application No. 2015/0147421 to TE et al. discloses a workpiece support table adapted to receive and secure a workpiece platform. The workpiece platform may comprise a plastic material that is removably mounted by one or more fasteners to the top surface of the workpiece support plate. A composite model is formed on the workpiece platform from a plurality of sequential layers of build material and sacrificial material.

U.S. Pat. No. 8,307,872 to Kendall et al. discloses a bonding machine for forming a structural member by curing. A tool or mandrel is mounted to a platen plate that is in turn mounted on a moveable tool platform. A pressure bladder (e.g., silicone rubber) is secured to a shroud that is secured to a platen plate mounted on a pressure platform. In a bonding operation, two composite sections and a splice member are installed between outer surfaces of the mandrel and bladder. The surfaces of the mandrel are heated and the bladder is pressurized to cure the two composite sections and a splice member together.

U.S. Pat. No. 7,993,123 to Wigand et al. discloses a method and apparatus for fabricating 3D models. The models are a composite including a finished model formed from a model material and sacrificial mold material. Each is formed by depositing boundaries formed of lines or areas including one or more sacrificial mold materials. The base upon which the model is deposited can be any material suitable to accept deposition of the model material and sacrificial mold material.

U.S. Pat. No. 6,572,356 discloses a thermoform mold that defines a cavity and is secured to a supporting surface of a press platen by a quick change tooling system. The quick-change tooling system includes: (a) parallel spaced channel members that are secured to a bottom surface of the mold and defining an open bottom cavity; (b) rail members secured to a top surface of a platen and dimensioned for receipt within the cavity; and (c) a locking coupler that secures the channel members and the rail members together.

SUMMARY

In an embodiment, a manufacturing tool for forming composite structures is provided. The tool includes at least one interchangeable mold template, each interchangeable mold template including a plurality of incorporated part shapes; and, a backbone that connects to and supports the at least one interchangeable mold template during a process of laying up prepreg composite material thereon to form a plurality of three-dimensional structures corresponding to the plurality of incorporated part shapes.

In another embodiment, a method for simultaneous manufacture of a plurality of composite structures is provided. The method includes providing an interchangeable mold template having a plurality of three-dimensional part shapes configured therein; fastening the interchangeable mold template to a backbone structure; laying up prepreg material over the interchangeable mold template to form a material layer; repeating the step of laying up prepreg material to form a plurality of material layers each having a predetermined fiber orientation with respect to an adjacent layer; unfastening the interchangeable mold template from the backbone structure; and, curing the plurality of material layers on the interchangeable mold template to form a plurality of structures corresponding to the plurality of three-dimensional part shapes.

In yet another embodiment, a tool for manufacturing composite structures is provided. The tool includes a mold template for receiving material layers thereon for forming one or more three-dimensional structures; and, a backbone structure for fastening the mold template thereto, the backbone structure having a longitudinal spindle enabling rotation of the backbone structure about a longitudinal axis of the spindle.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
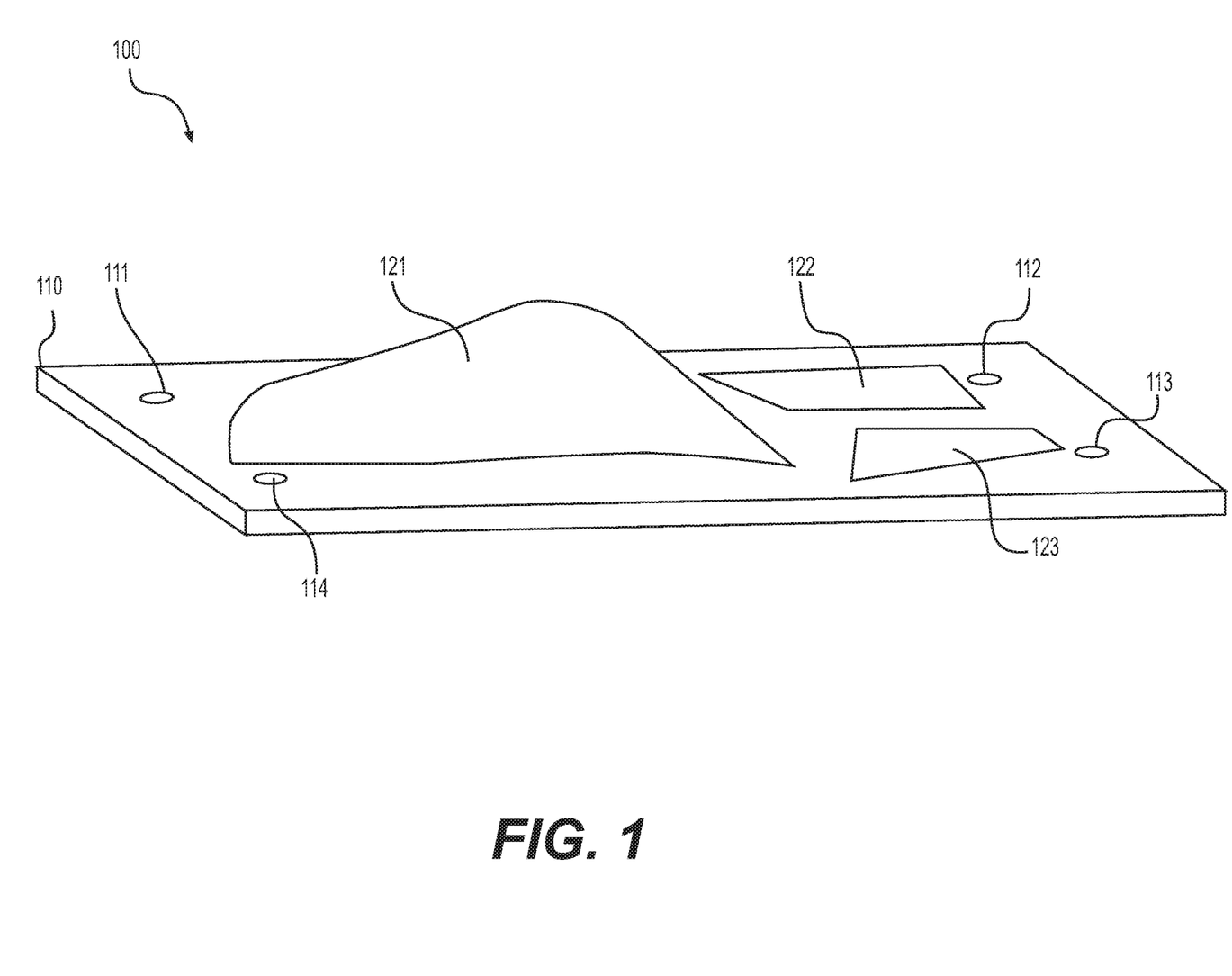
FIG. 1 is a schematic drawing of an interchangeable mold template for nested manufacturing of composite structures, in an embodiment.

FIG. 1 shows an exemplary mold template 100 for nested manufacturing of composite structures. Mold template 100 mounts to a backbone 200, FIG. 2, which together comprise a manufacturing tool for forming composite structures.

Mold template 100 includes a platform 110 that is generally planar and configured for supporting at least two part shapes, such as a first part shape 121, a second part shape 122, and a third part shape 123. The part shapes will each independently define some shape that either extends up from (or could be recessed into) the platform, or is in some instances flat like the platform for the purpose of creating a matching configuration in a processed composite part. The part shapes are for example solid tools, which may be arranged to account for their geometry by orienting them in ways that make best use of the space allowed, in other words "nesting" them together. The term "nesting" as used in this application should be interpreted as meaning that part shapes or solid tools are oriented within the mold template to provide space sufficient to separate structures after curing. Nesting of parts is compatible with alignment such that the materials may be efficiently applied to the shapes simultaneously as part of a batch layup process. An improvement provided by nesting includes a reduction in unnecessarily large spaces between the part shapes, thereby reducing waste of composite material. Platform 110 and the at least two part shapes may be made of a material, such as a single polymer, compatible with autoclaving to cure composite structures (e.g., simultaneous exposure to high temperature and high pressure). Example materials include but are not limited to reinforced polymers and metal alloys.

Figure 4:
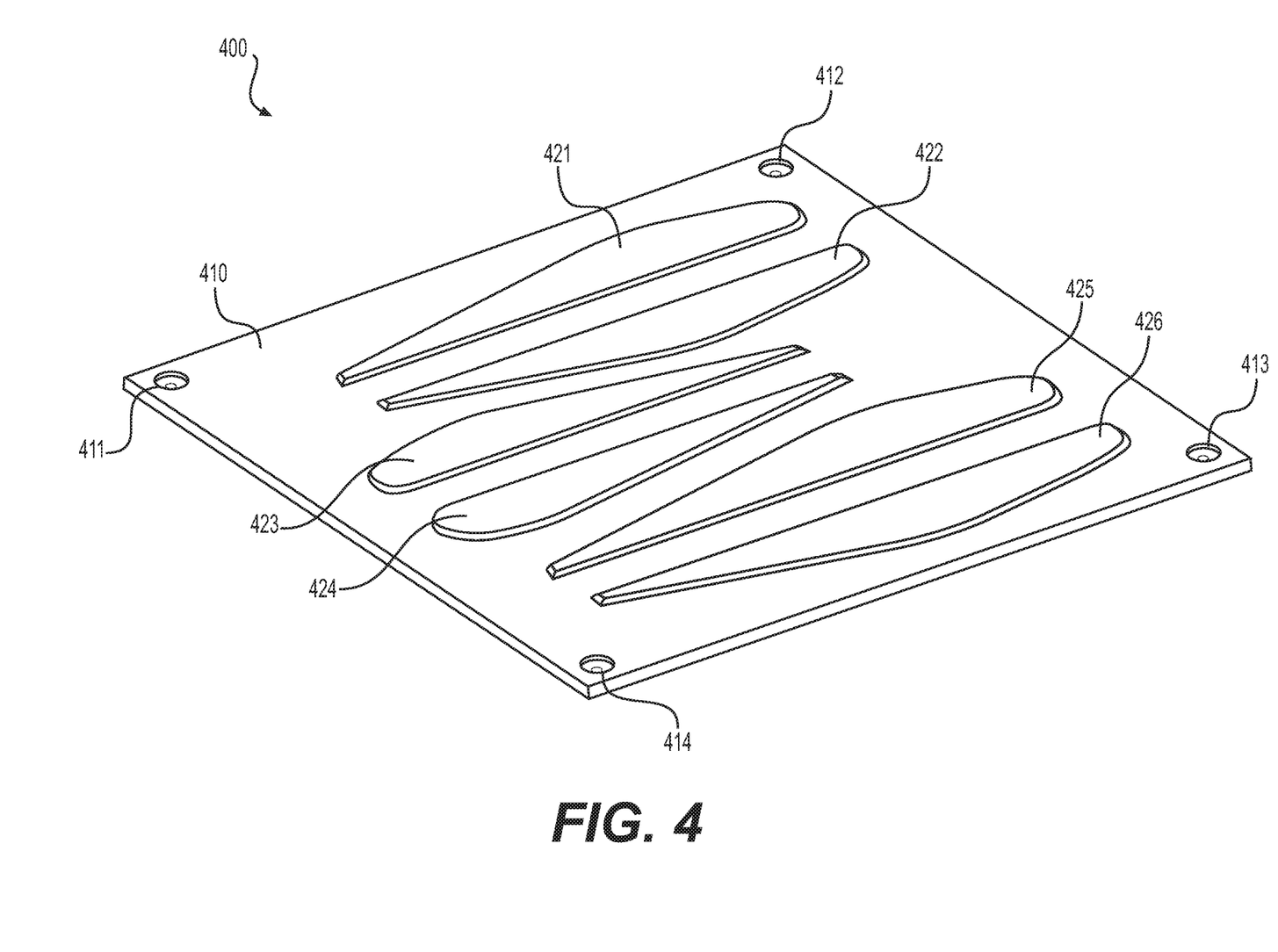
FIG. 4 is a schematic drawing of another embodiment of an interchangeable mold template for nested manufacturing of composite structures.
Figure 5:
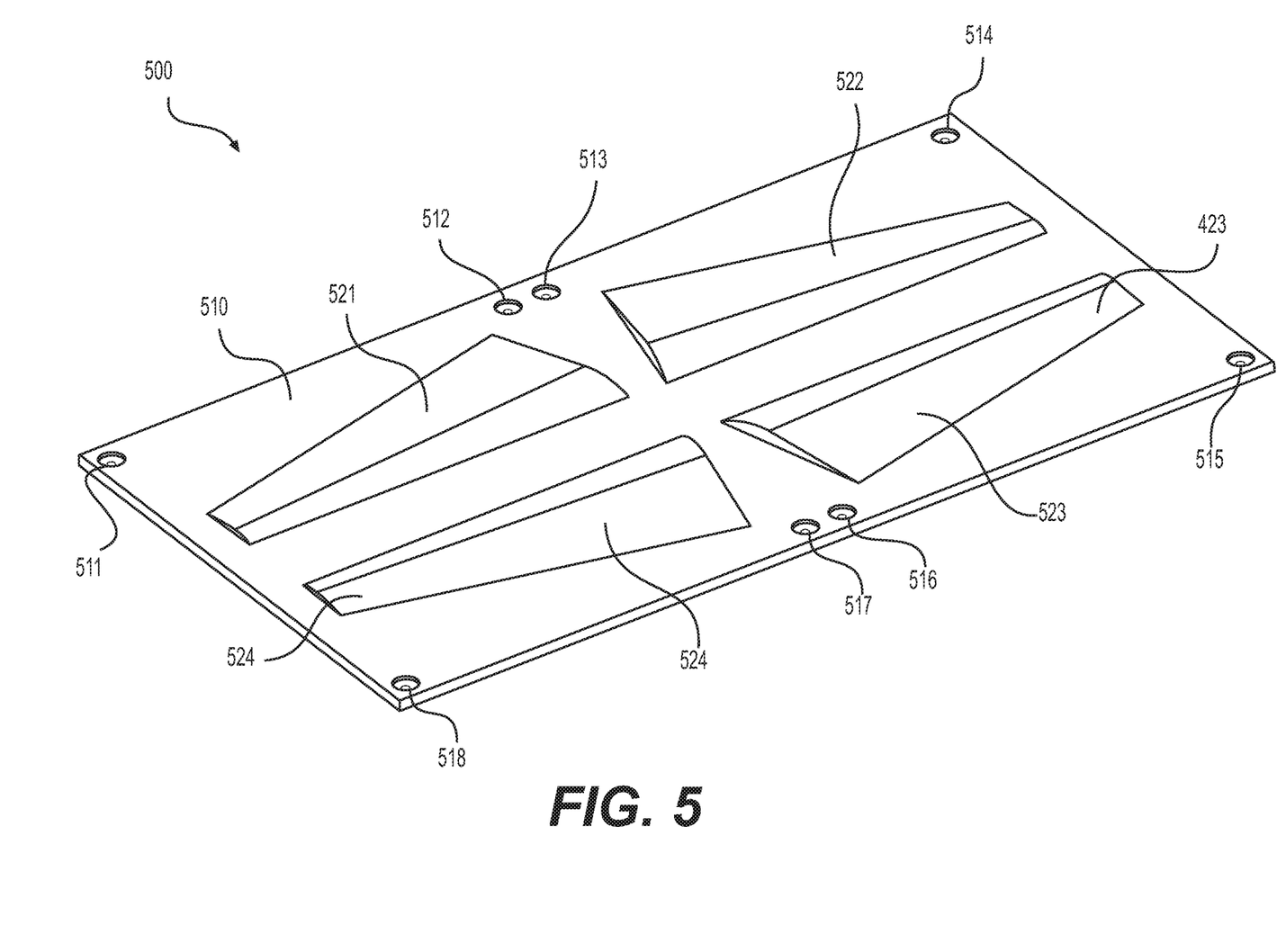
FIG. 5 is a schematic drawing of yet another embodiment of an interchangeable mold template for nested manufacturing of composite structures.
Figure 6:
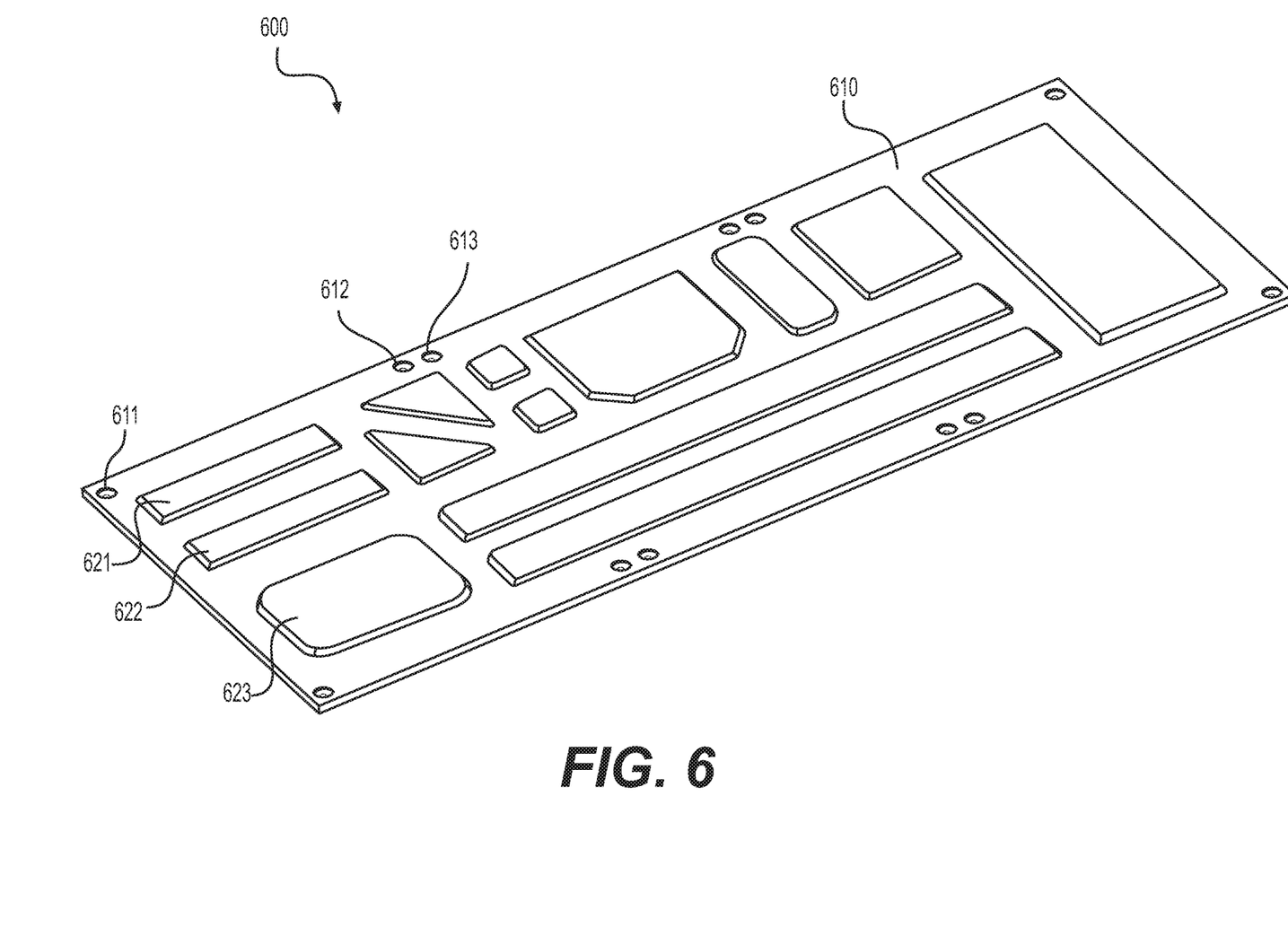
FIG. 6 is a schematic drawing of yet another embodiment of an interchangeable mold template for nested manufacturing of composite structures.

First, second, and third part shapes 121, 122, 123 may be three-dimensional (3D) shapes. The term "3D" as used in this application should be interpreted as meaning that the shape has some thickness relative to its width and/or length. In contrast, the term "2D" as used in this application should be interpreted as meaning that the shape is generally planar or flat and that the thickness is relatively small compared to its width and/or length. In certain embodiments, the at least two part shapes have 3D shape but additional part shapes may have either 2D or 3D shape without departing from the scope hereof. FIGS. 4-6, described below, illustrate additional embodiments of a mold template.

Figure 2:
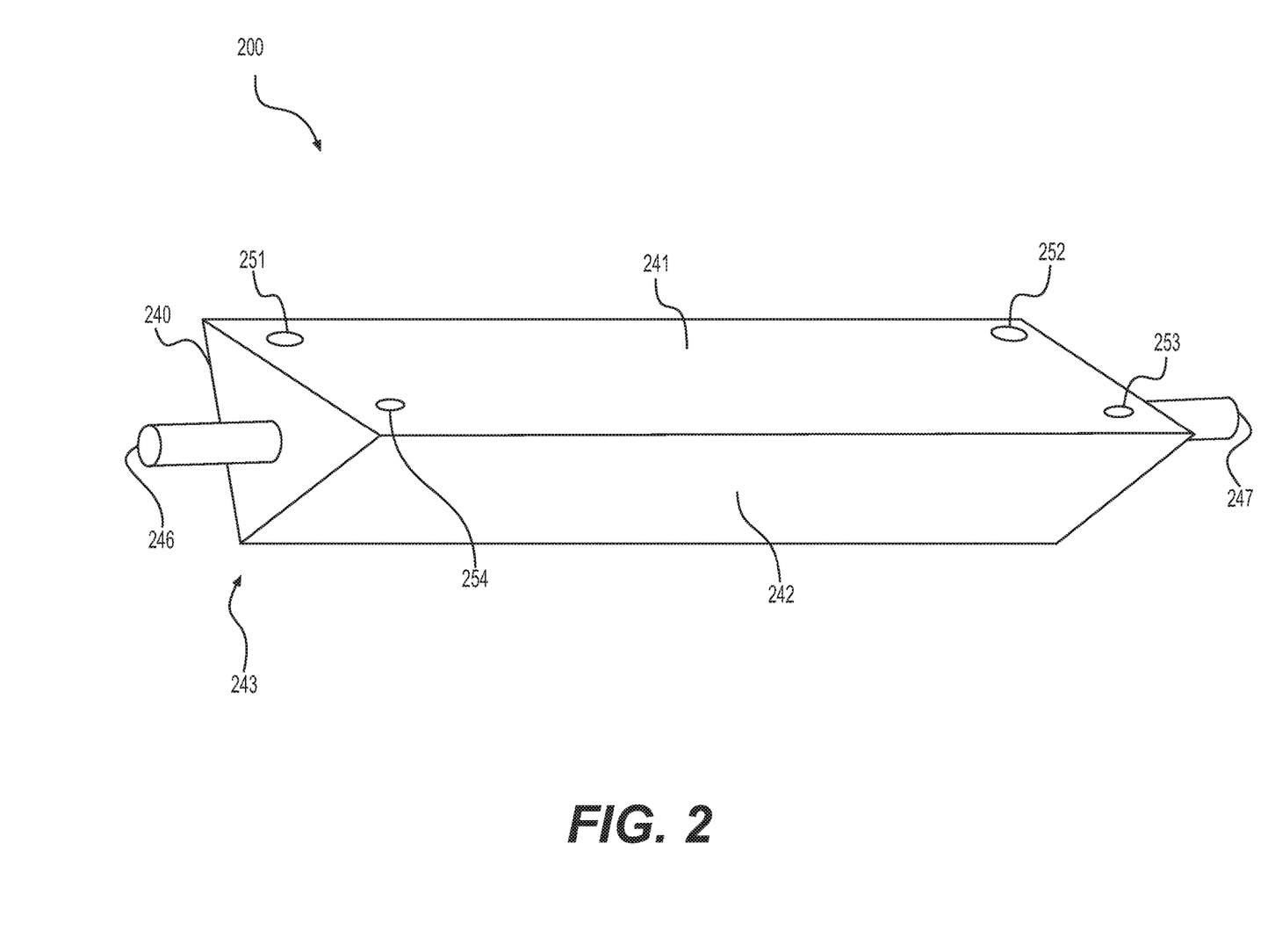
FIG. 2 is a schematic drawing of a backbone for nested manufacturing of composite structures, in an embodiment.

FIG. 2 shows a backbone 200 for nested manufacturing of composite structures, in an embodiment. Backbone 200 includes a truss 240 with spindle, having a first end 246 and a second end 247, mechanically coupled thereto. A rotary mechanism may be coupled to the spindle's first end 246 and second end 247 for rotating backbone 200 along a longitudinal axis. As depicted in FIG. 2, truss 240 has a triangular cross-sectional shape and three sides, namely a first side 241, a second side 242, and a third side 243, but the truss may have a rectangular cross-sectional shape (see e.g., FIG. 11) or other cross-sectional shape without departing from the scope hereof.

Backbone 200 may serve as a common backbone to a variety of interchangeable mold templates that are each customized with part shapes to form different structures. Each custom mold template is secured to the common backbone using one or more fasteners for example, as described below for mold template 100 and backbone 200. Several advantages are attained by backbone 200 serving as a common backbone, such as compatibility with an automated tape or fiber placement device, which will become apparent in light of the description below. FIGS. 7-12, described below, illustrate additional embodiments of a backbone.

Mold template 100, FIG. 1 includes one or more attachment features, and backbone 200, FIG. 2 includes one or more corresponding attachment features for securing mold template 100 to backbone 200 via fasteners. For example, platform 110, FIG. 1 includes a first, second, third, and fourth attachment feature 111, 112, 113, and 114 that correspond respectively to a first, second, third, and fourth attachment feature 251, 252, 253, 254 of first side 241, FIG. 2. One or more fasteners may be used to secure mold template 100 to backbone 200 via respective pairs of corresponding attachment features. Example fasteners include but are not limited to threaded bolts, indexing pins, pins with locking features and mechanical latches. In an embodiment, more than one tool template may be configured to mount to a common backbone (see e.g., FIGS. 7, 8, and 11).

Once mold template 100 is secured to backbone 200, processes for laying up composite material may be performed. In an embodiment, processes for laying up composite material are performed using steps 330, 340, and 350 of method 300, which are described below in connection with FIG. 3. Following layup of composite material, mold template 100 may be removed from backbone 200 for performing additional processes for forming composite structures, such as bagging and autoclaving, as described below in connection with method 300. Meanwhile, another mold template, different from mold template 100, may be secured to backbone 200 for laying up composite material. In this manner, backbone 200 and mold template 100 may be simultaneously used in different steps of method 300 enabling efficient use of resources.

Figure 3:
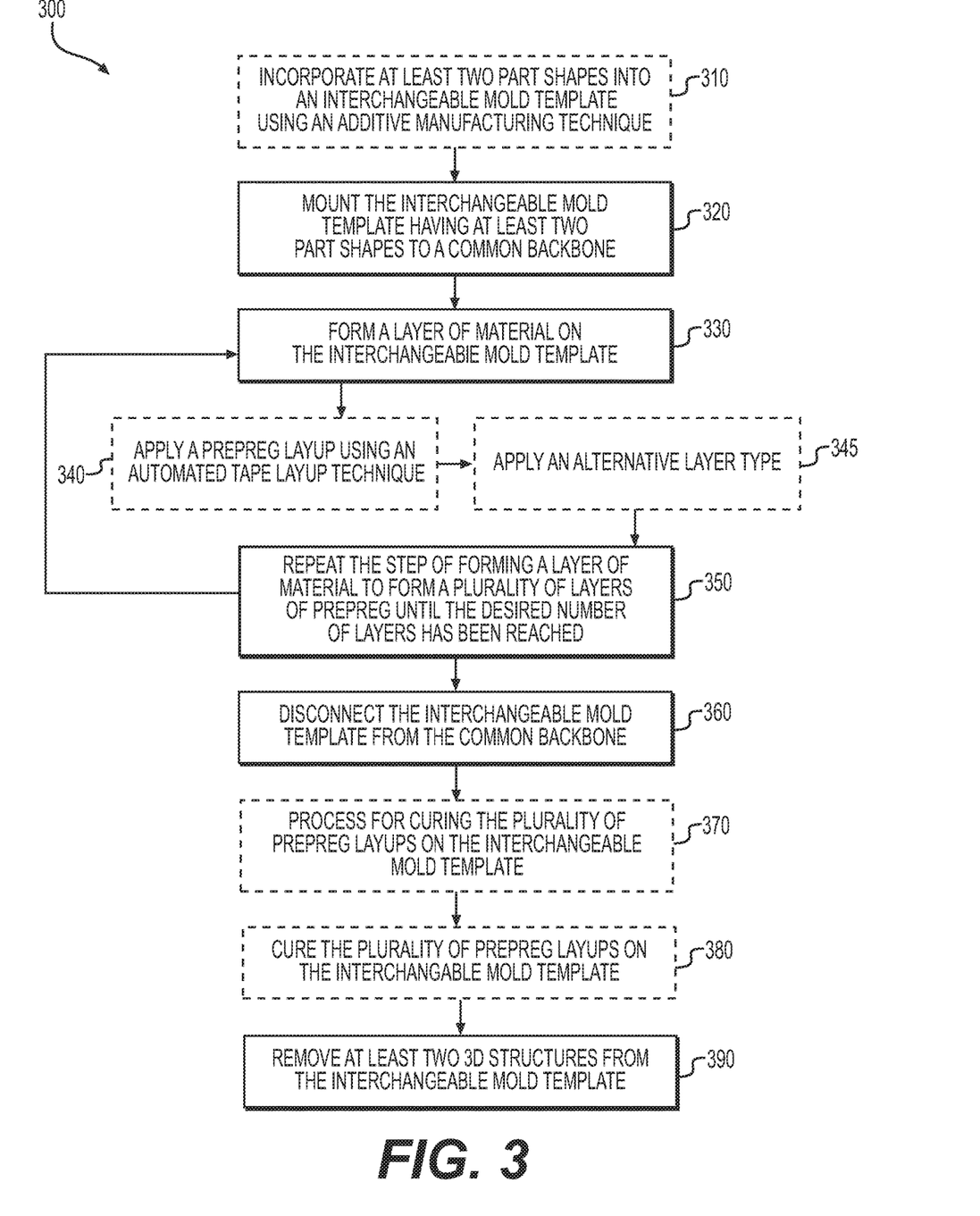
FIG. 3 is a block diagram showing steps of a method for nested manufacturing of composite structures using the interchangeable mold template of FIG. 1 and the backbone of FIG. 2, in an embodiment.

FIG. 3 shows steps of an exemplary method 300 for nested manufacturing of structures using an interchangeable mold template and a common backbone, such as mold template 100, FIG. 1 and backbone 200, FIG. 2, for example.

In an optional step 310, at least two part shapes are formed using an additive manufacturing technique. In an example of step 310, first, second, and third part shapes 121, 122, 123 of mold template 100, FIG. 1 are formed using an additive manufacturing technique. The term "additive manufacturing technique" as used in this application should be interpreted as meaning that material is added to form something, as opposed to traditional machining techniques in which material is removed to form something. In additive manufacturing techniques, such as 3D printing, material is deposited in layers that are bonded together to form a 3D structure. For example, big area additive manufacturing (BAAM) involves applying layers of fiberglass reinforced epoxy with a glue gun. Other exemplary 3D printing techniques include stereolithography, selective laser melting/sintering, direct metal laser sintering, direct metal deposition, fused deposition modeling, laminated object manufacturing, and electron beam melting. Using an additive manufacturing technique to produce part shapes 121, 122, 123 may further reduce lead time and cost compared to traditional subtractive (e.g., machining) techniques.

Step 310 is optional because the at least two part shapes may be formed by subtractive techniques, such as machining or extruding that remove material from an initial substrate to form a part shape or solid tool. In an embodiment, a combination of additive and subtractive manufacturing techniques is used to form the at least two part shapes.

In a step 320, an interchangeable mold template having at least two part shapes is provided and mounted to a backbone. In an example of step 320, mold template 100, FIG. 1 is provided having first, second, and third part shapes 121, 122, 123, and mounted to backbone 200, FIG. 2. Mold template 100 may be mounted via one or more of attachment features 111, 112, 113, 114 to a corresponding one or more of attachment features 251, 252, 253, 254 of backbone 200, respectively, using one or more fasteners.

In a step 330, a layer of material is formed on an interchangeable mold template. In an example of step 330, a layer of composite lamina is applied to mold template 100, FIG. 1. The composite lamina may include, for example, reinforcing fiber that has been pre-impregnated with resin, which is commonly referred to as a "prepreg layup" or "prepreg" for short. Depending on the size and shape of the part shapes, the prepreg layup may include one or more strips of composite lamina placed adjacent or overlapping with one another to form a layer. The at least two part shapes may be arranged to accommodate a relative fiber orientation of the prepreg layups for each layer of prepreg material and for each of the at least two part shapes. Because the prepreg layups undergo deformation due to gravity prior to curing, the prepreg layups are placed on the generally upward-facing surface of mold template 100 with respect to gravity. For applying prepreg layups to the opposite side, the backbone may be staged with corresponding part shapes configured for a subsequent layup operation. The prepreg layups may be placed by hand or using an automated layup technique as described below in optional step 340. In an alternative embodiment, a layer made of a material different than composite lamina is formed on mold template 100, such as a metal or plastic material for example.

In an optional step 340, prepreg layups are placed on the mold template using an automated technique. In an example of step 340, prepreg layups are simultaneously placed on first, second, and third part shapes 121, 122, 123 of mold template 100 using an automated technique, such as an automated prepreg layup technique, an automated tape layup technique, or a filament winding technique for example. Automated application of prepreg layups may be performed using specialized equipment such as the Cincinnati VIPER® fiber placement system and the ATLAS ONE tape layer.

In an optional step 345, an alternative layer type may be applied for inclusion between layers. In an example of step 345, a lightning strike layer may be applied. The lightning strike layer includes for example wire mesh or similarly conductive material for dissipating electrical current to an electrical ground for minimizing damage from lighting strikes.

In a step 350, method 300 returns to step 330 to repeat forming a layer on the mold template to form a plurality of layers. In an example of step 350, method 300 returns to step 330 to repeat laying up composite lamina on mold template 100, FIG. 1. Step 330, and optionally steps 340 and 345, are repeated until a desired number of layers are stacked on the at least two part shapes to achieve a final thickness. Upon completion of step 350, the resulting at least two structures have the 3D shape of a respective one of the at least two part shapes within the mold template, such as first, second, and third part shapes 121, 122, 123 of mold template 100, FIG. 1.

Reinforcing fibers of an individual prepreg layup are typically oriented along a single direction, providing anisotropic strength. To attain a more isotropic strength for the composite structure, layers of prepreg layups are arranged with alternating or varying fiber orientations within a ply stack to provide strength in more than one direction. Thus, in certain embodiments, when step 330 and optionally step 340 are repeated to form a ply stack from a plurality of prepreg layers, each layer employs alternating or varying fiber orientations with respect to the most recently applied layer.

When forming a 2D structure, or when laying up prepregs for a single structure, the task of alternating or varying fiber orientations to achieve a desired strength in multiple directions is relatively simple. However, when forming 3D structures, or when simultaneously laying up prepregs for at least two structures, the task of alternating or varying fiber orientations to achieve a desired strength in multiple directions is substantially more complicated. In certain embodiments, a 3D computer model of each structure is employed that includes a layer-by-layer definition. The layer-by-layer definition of a plurality of structure models may be analyzed to determine commonality of fiber orientations. Based on the commonality, a plurality of nested parts may be laid-up simultaneously with the parts geometrically aligned for efficiency (e.g., optimized to reduce machine run time and reduce material waste). In other words, the layer-by-layer definition and geometry of the structures being nested are used to define the "nest".

In a step 360, the interchangeable mold template is disconnected from the common backbone. In an example of step 360, mold template 100, FIG. 1 is disconnected from backbone 200, FIG. 2 by for example removing one or more fasteners between attachment features 111, 112, 113, 114 of mold template 100 and corresponding attachment features 251, 252, 253, 254 of backbone 200, respectively.

In an optional step 370, a plurality of prepreg layups on the interchangeable mold template are processed for curing. In an example of step 370, a plurality of prepreg layups on mold template 100 are processed together for curing via bagging.

In an optional step 380, the plurality of prepreg layups on the interchangeable mold template are cured. In an example of step 380, the plurality of prepreg layups on the interchangeable mold template are cured via autoclaving. Autoclaving may include simultaneous exposure to a temperature of at least about 350 degrees Fahrenheit (° F.) and a pressure of at least about 80 pounds-per-square-inch (psi).

In a step 390, at least two 3D structures are removed from the interchangeable mold template and the structures are finished. In an example of step 390, composite structures that match first, second, and third part shapes 121, 122, 123 of mold template 100, FIG. 1 are removed from mold template 100 by trimming. In an embodiment, the cured composite structures are removed using standard hand tools and spatulas taking care not to damage the tooling surfaces or the molded components.

Method 300 results in at least two simultaneously formed composite structures. In an example of method 300, a first, second, and third composite structures are simultaneously formed having the 3D shape of first, second, and third part shapes 121, 122, 123 of mold template 100, FIG. 1, respectively. Method 300 provides advantages for manufacturing composite structures by increasing throughput and reducing waste of material. Traditional fabrication processes for individual structures requires a stand-alone tool with its own layup processing including bagging and other consumable materials. Nesting a plurality of part shapes for batch processing reduces labor and consumable material costs. Nesting a plurality of part shapes with common layer-bylayer definition enables more widespread use of automated layup processes, especially for smaller structures which would otherwise be too costly for automated layup processes due to the duplication of labor required for each structure.

FIG. 4 shows a mold template 400, which is an example of mold template 100, FIG. 1. Mold template 400 includes a generally planar platform 410 configured for supporting a first, second, third, fourth, fifth, and sixth part shape 421, 422, 423, 424, 425, and 426, respectively. Mold template 400 may be secured via one or more fasteners to a backbone, such as backbone 200, FIG. 2, using one or more of a first, second, third, and fourth attachment feature 411, 412, 413, and 414 that correspond respectively to the first, second, third, and fourth attachment feature 251, 252, 253, 254, FIG. 2. Mold template 400 includes similar 3D part shapes with common layer-by-layer definition enabling nesting together for batch ply stacking.

FIG. 5 shows a mold template 500, which is an example of mold template 100, FIG. 1. Mold template 500 includes a generally planar platform 510 configured for supporting a first, second, third, and fourth part shape 521, 522, 523, and 524, respectively. Mold template 500 may be secured via one or more fasteners to a backbone using one or more of a first, second, third, fourth, fifth, sixth, seventh, and eighth attachment feature 511, 512, 513, 514, 515, 516, 517, and 518 that correspond with backbone attachment features (see e.g., FIGS. 7, 8, and 11). Mold template 500 includes similar 3D part shapes with common layer-by-layer definition enabling nesting together for batch ply stacking.

FIG. 6 shows a mold template 600, which is an example of mold template 100, FIG. 1. Mold template 600 includes a generally planar platform 610 configured for supporting a plurality of part shapes, such as a first part shape 621, a second part shape 622, a third part shape 623, etc. Mold template 600 may be secured via one or more fasteners to a backbone using one or more attachment features, such as a first 611, second 612, third 613 attachment feature, etc., which correspond with backbone attachment features (see e.g., FIGS. 8 and 11). Not all part shapes and not all attachment features are enumerated in FIG. 6 for clarity of illustration. Mold template 600 includes similar 3D part shapes with common layer-by-layer definition enabling nesting together for batch ply stacking.

Figure 7:
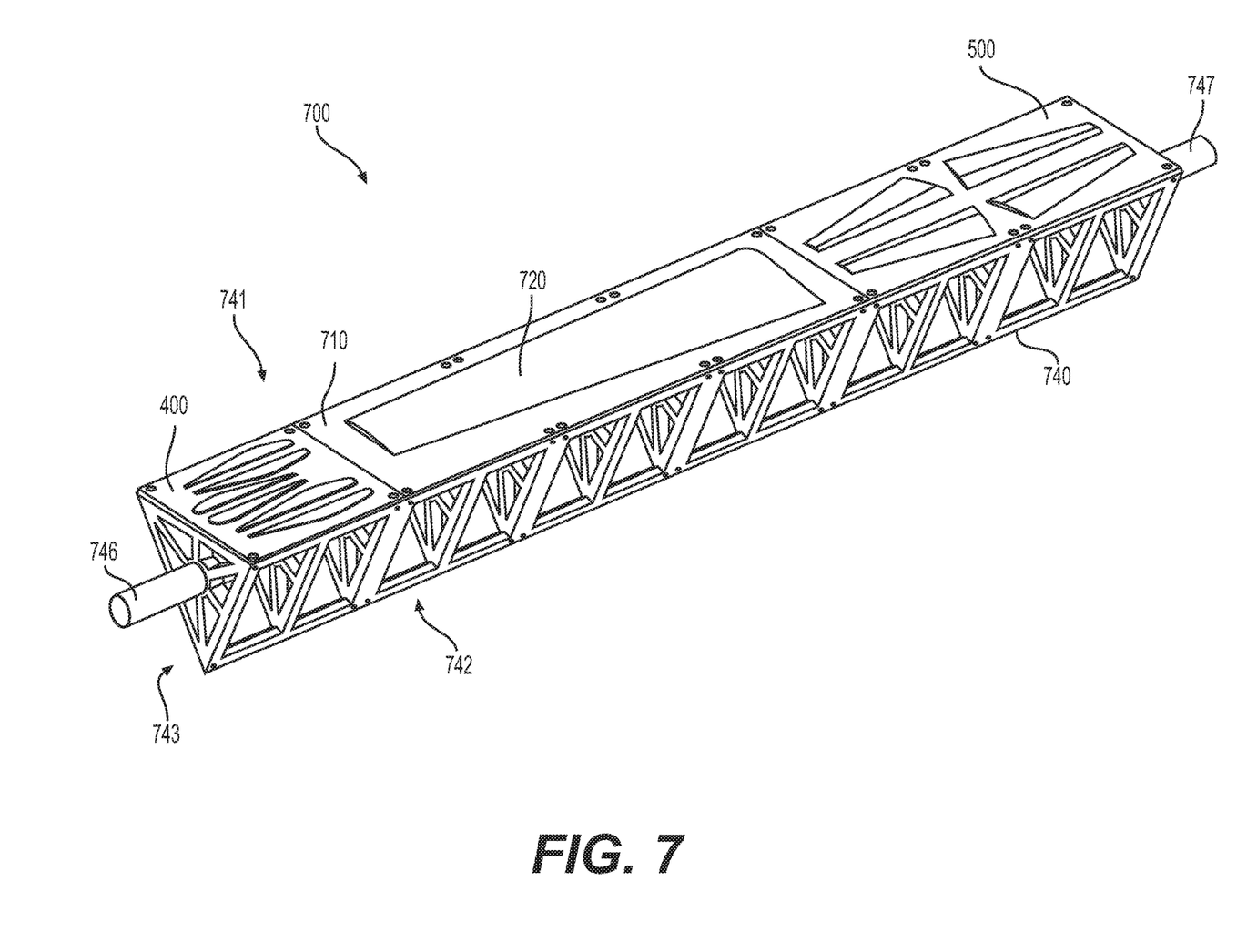
FIG. 7 is a schematic drawing of three interchangeable mold templates on a first side of a backbone for nested manufacturing of composite structures, in an embodiment.

FIG. 7 shows a backbone 700, which is an example of backbone 200, FIG. 2. Backbone 700 includes a truss 740, having a first side 741, a second side 742, and a third side 743, with a mechanically-coupled spindle having a first end 746 and a second end 747 protruding out of truss 740 along its longitudinal axis. Mounted on first side 741 of truss 740 is mold template 400, FIG. 4, mold template 500, FIG. 5, and a mold template 710 that includes a part shape 720. Backbone 700 provides an example of similar 3D part shapes among a plurality of mold templates with common layer-by-layer definition enabling nesting together for batch ply stacking. Note that backbone 700 may simultaneously support mold templates of various sizes.

Figure 8:
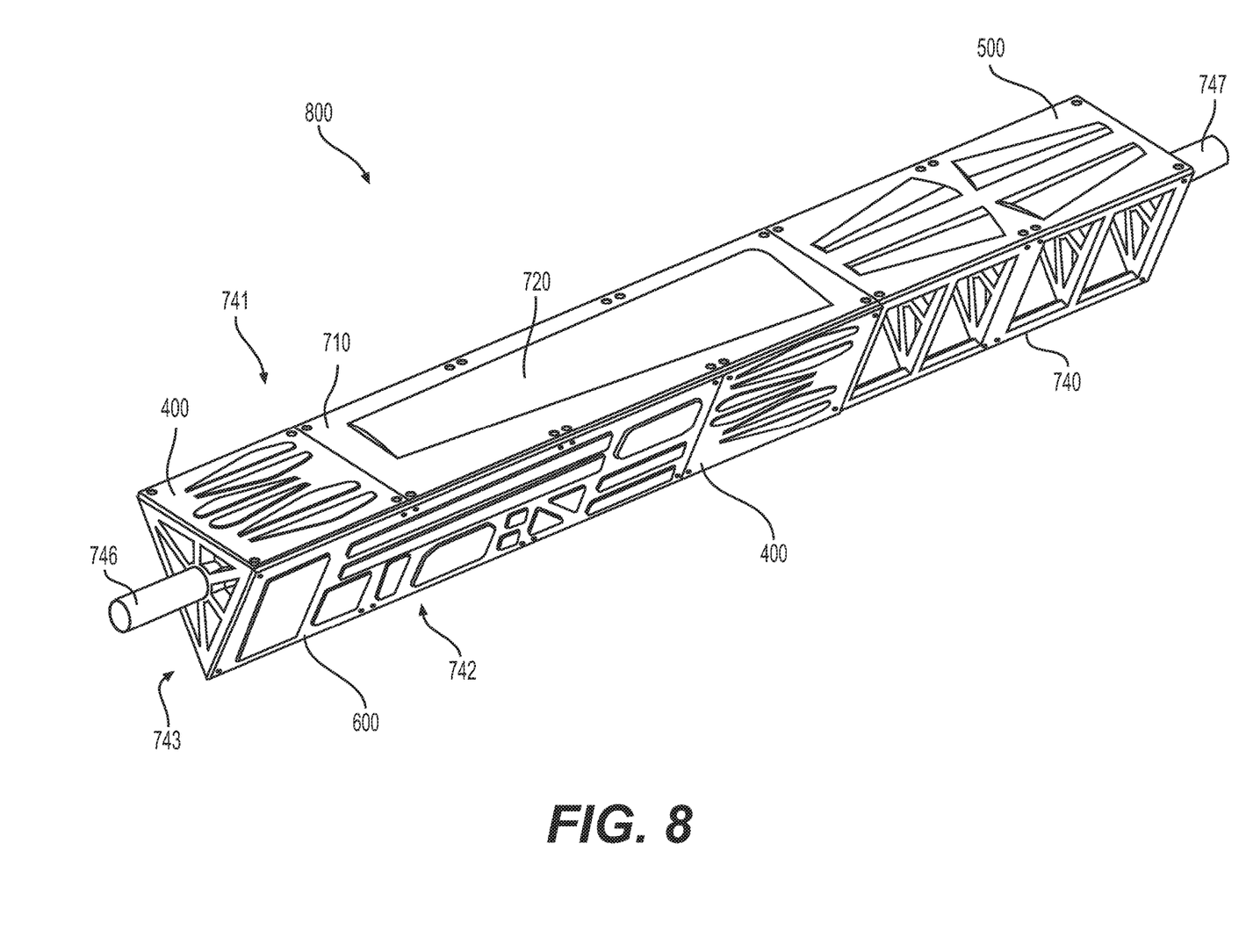
FIG. 8 is a schematic drawing of the backbone of FIG. 7 with additional interchangeable mold templates mounted to a second side of the backbone for nested manufacturing of composite structures, in an embodiment.
Figure 9:
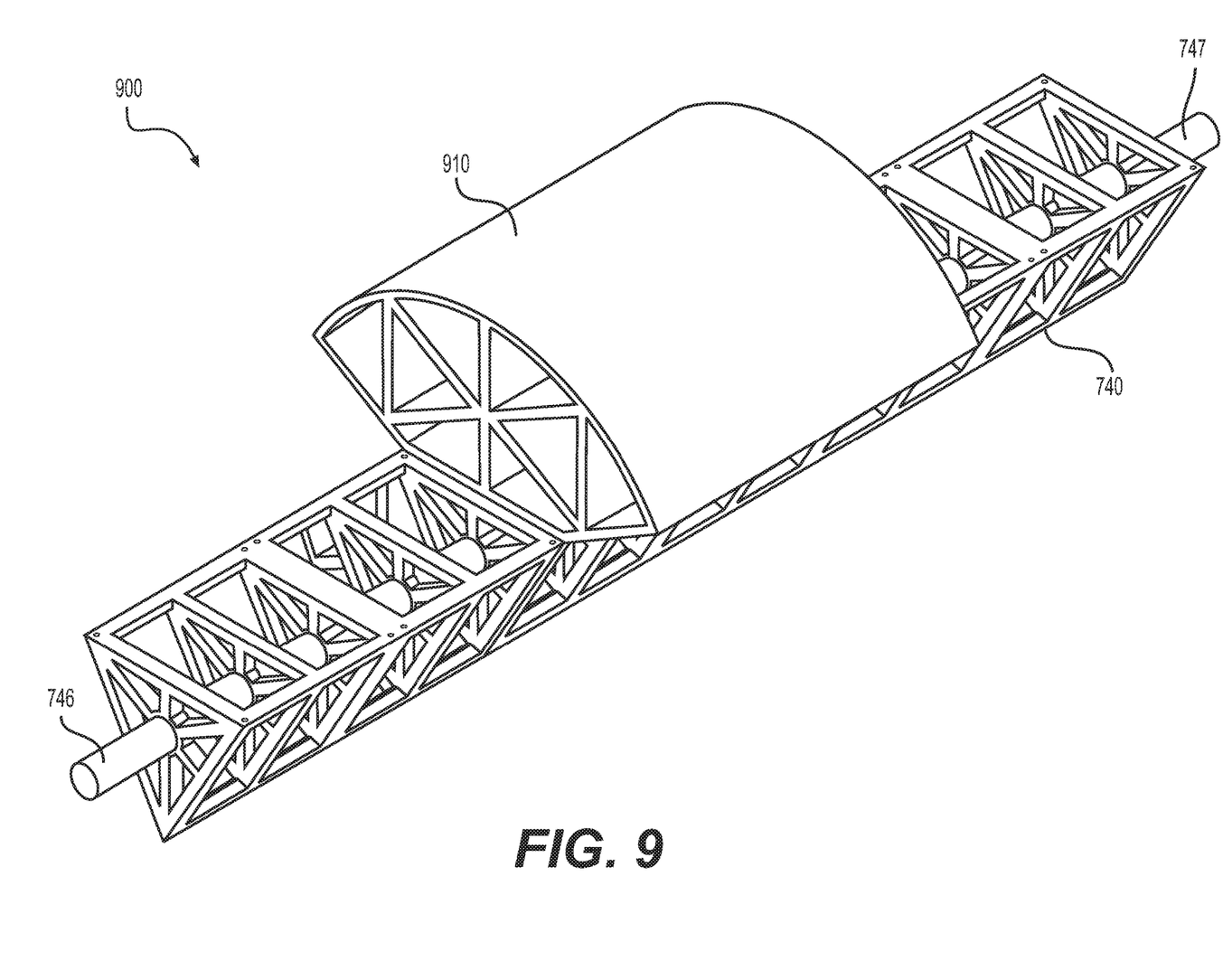
FIG. 9 is a schematic drawing of a semi-cylindrical interchangeable mold template on the backbone of FIG. 7, in an embodiment.
Figure 10:
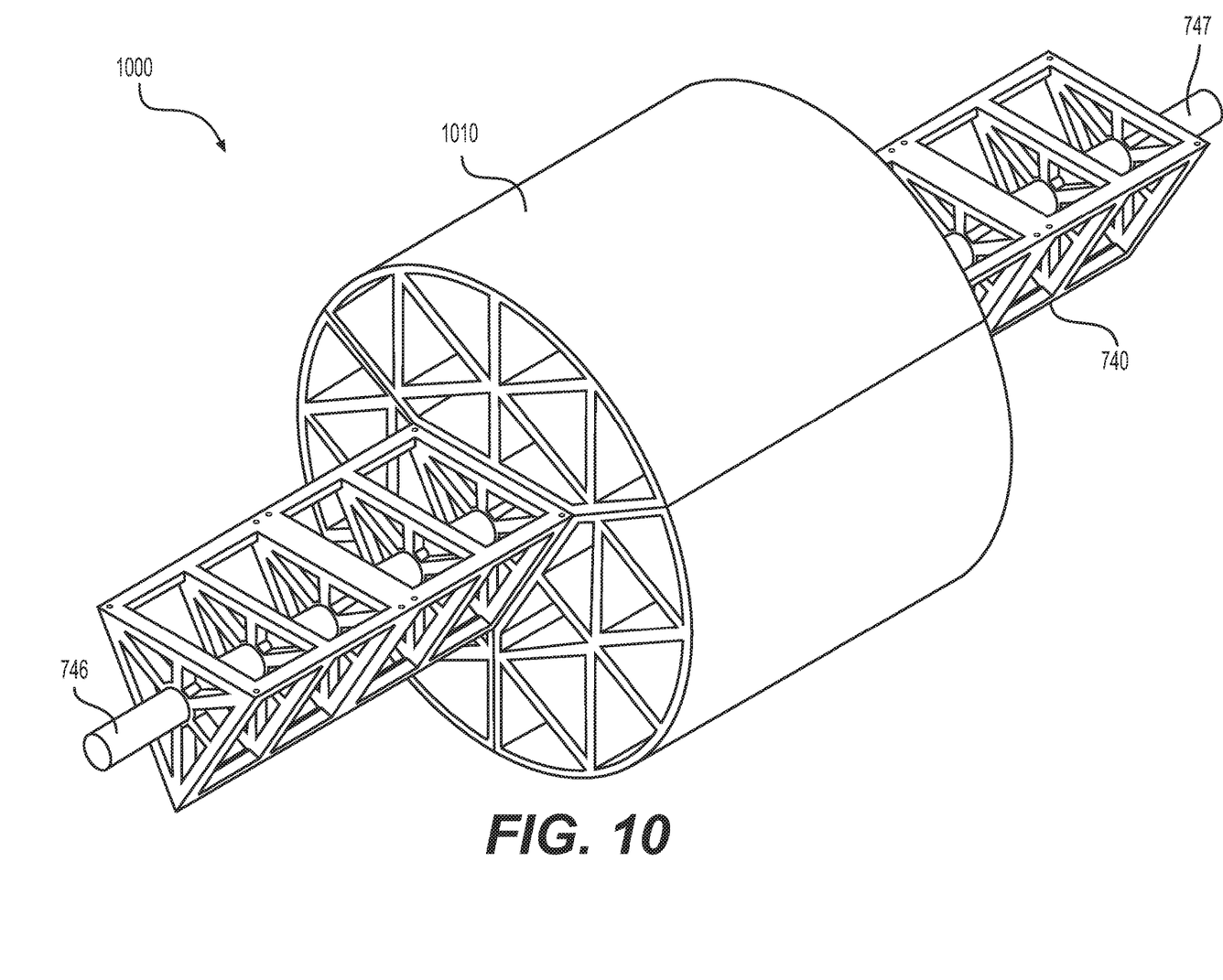
FIG. 10 is a schematic drawing of a cylindrical interchangeable mold template on the backbone of FIG. 7, in an embodiment.

FIG. 8 shows a backbone 800, which is an example of backbone 700, FIG. 7 with mold templates mounted to a second side. FIGS. 8-10 include many of the same components as FIG. 7 and are enumerated with like numerals; accordingly, their description may not be repeated. Backbone 800 includes mold template 600, FIG. 6 and mold template 400, FIG. 4, mounted to second side 742 of truss 740. In certain embodiments, mold templates 400 and 600 may be mounted on second side 742 while first side 741 is being indexed for fiber placement to increase throughput.

FIG. 9 shows a backbone 900 with a non-planar mold template 910 mounted on truss 740. The non-planar mold template 910 illustrates an embodiment used to manufacture a substantially curved 3D composite structure.

FIG. 10 shows a backbone 1000 with a cylindrical mold template 1010 mounted on truss 740. The cylindrical mold template 1010 illustrates an embodiment used to manufacture a cylindrical composite structure, such as a fuselage section of an airplane. Prepreg layups may be placed on mold template 1010 by hand draping a top section, rotating truss 740, and repeating. Alternatively, an automated layup process may be employed.

Figure 11:
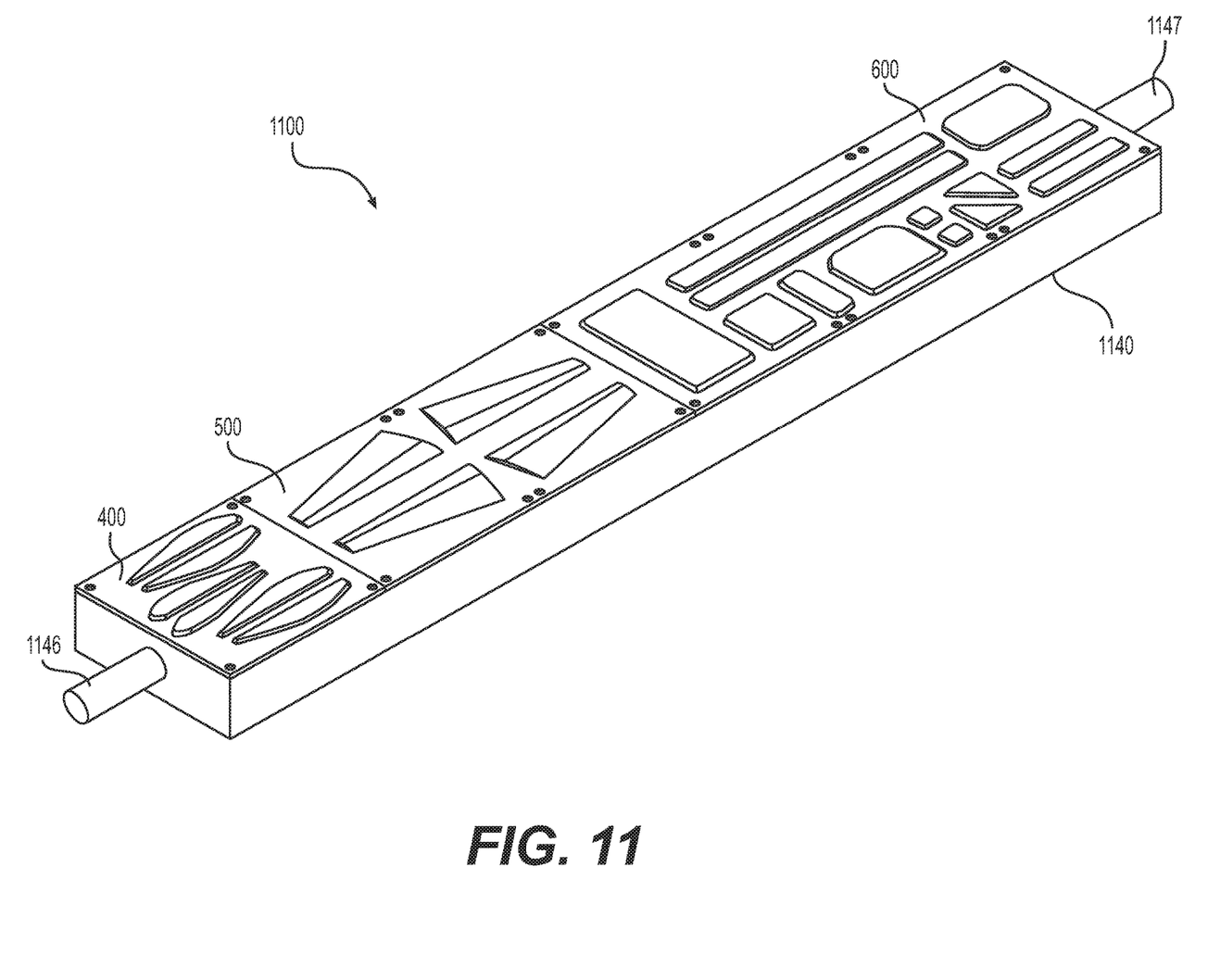
FIG. 11 is a schematic drawing of interchangeable mold templates mounted to another embodiment of a backbone for nested manufacturing of composite structures.

FIG. 11 shows a generally planar backbone 1100 with mold templates 400, 500, and 600 mounted thereon. Backbone 1100 may be configured for mounting one or more mold templates on a single side or on two sides (e.g., a top side and a bottom side). The bottom side of backbone 1100 may be accessed by rotating along a longitudinal axis aligned with a spindle having a first end 1146 and a second end 1147 extending from backbone 1100. In an embodiment, backbone 1100 includes one or more mold templates on a top side while a balance weight is mounted to a bottom side.

Figure 12:
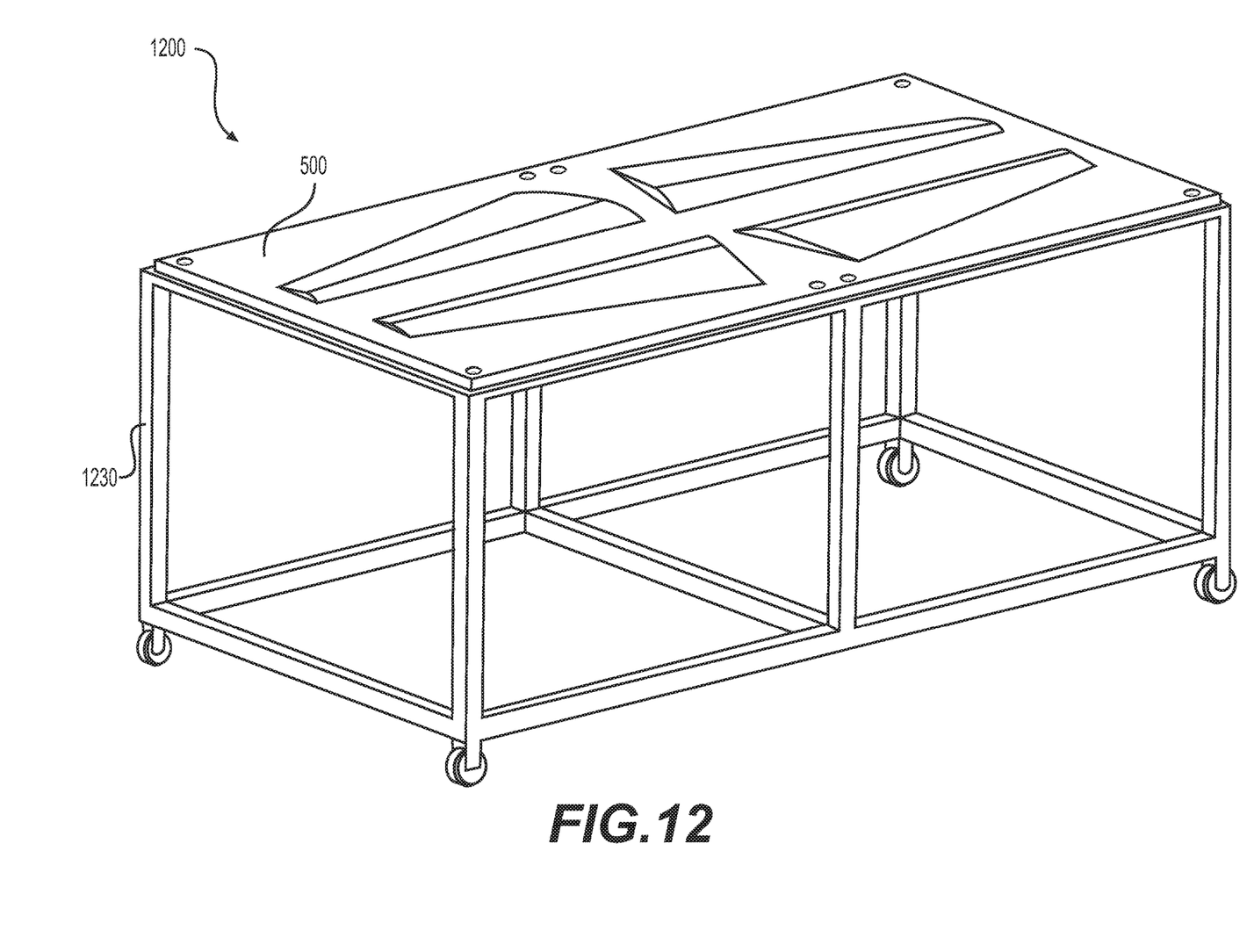
FIG. 12 is a schematic drawing of an interchangeable mold template on a table, in an embodiment.

FIG. 12 shows a backbone 1200 for a hand processing with mold template 500 mounted thereon. Backbone 1200 is configured on a wheeled table 1230 for traditional hand layup techniques, as well as other processing performed by hand. By nesting a plurality of part shapes together in mold template 500, savings of labor and material may be realized compared to traditional hand layup techniques designed for forming individual structures.

In an embodiment, backbone 1200 is used in combination with other backbones, such as those shown in FIGS. 2, 7, 8, 9, and 11. For example, mold template 500 may have common layer-by-layer definition with mold templates 400 and 600 and undergo simultaneous ply stacking on common backbone 1100, FIG. 11. Following simultaneous ply stacking, mold template 500 may be transferred to backbone 1200 for further processing, such as additional ply stacking by hand, adding an alternative layer (e.g., a lightning strike layer), or custom curing. Alternatively, mold template 500 may be cured together with mold templates 400 and 600 on backbone 1100, FIG. 11, then mold template 500 is transferred to backbone 1200 for post-processing by hand.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A nested manufacturing system for forming composite structures, the system comprising:
 a truss having a plurality of sides and a spindle, wherein the spindle enables rotation about a longitudinal axis of the truss;
 a plurality of interchangeable mold templates, each comprising:

a platform that is generally planar;

a plurality of part shapes that extend up from the platform for forming a plurality of three-dimensional structures, respectively, and wherein the plurality of part shapes includes at least two different structure types that have different geometries; and a nested arrangement of the plurality of part shapes within each of the plurality of interchangeable mold templates, wherein the plurality of part shapes that have different geometries are arranged on the platform to provide sufficient space to separate the plurality of three-dimensional structures after curing; and wherein the truss simultaneously supports the plurality of interchangeable mold templates, and at least two of the interchangeable mold templates are mounted on a first side of the truss adjacent one another along the longitudinal axis.

2. The nested manufacturing system of claim 1, wherein the nested arrangement of the plurality of part shapes is configured such that each layer of the plurality of three-dimensional structures comprises a commonality of fiber orientations and adjacent layers of the plurality of three-dimensional structures comprise varied fiber orientations to achieve a desired strength in multiple directions.

3. The nested manufacturing system of claim 1, wherein the at least one interchangeable mold template is made of a polymer that enables autoclaving with simultaneous exposure to a temperature of at least about 350 degrees Fahrenheit and a pressure of at least about 80 pounds per square inch.

4. The nested manufacturing system of claim 1, wherein the at least one interchangeable mold template is printed using a three-dimensional printing technique.

5. The nested manufacturing system of claim 1, wherein the at least one interchangeable mold template is compatible with an automated tape placement technique.

6. A nested manufacturing system for forming a variety of composite structures simultaneously, comprising:

a first mold template having a plurality of solid tools configured for receiving material layers thereon for simultaneously forming a plurality of three-dimensional structures, the plurality of three-dimensional structures including at least two differently-shaped structures;

a second mold template having a plurality of solid tools configured for receiving material layers thereon for forming a plurality of structures simultaneously with the first mold template;

a backbone structure for fastening the first mold template and the second mold template thereto, the backbone structure having a spindle enabling rotation of the backbone structure about a longitudinal axis of the spindle;

wherein the backbone structure comprises a first side connecting the first mold template adjacent the second mold template along the longitudinal axis; and a nested arrangement of the plurality of solid tools within the first mold template, comprising geometric alignment of the plurality of solid tools having spaces therebetween that are sufficient to separate the plurality of three-dimensional structures after curing.

7. The system of claim 6, wherein the first mold template is usable to receive prepreg composite layers and pre-processed metal layers.

8. A system for forming composite structures comprising:

a truss having three sides internally connected via a plurality of web structures coupled to a spindle and spaced apart along the longitudinal axis, wherein the spindle enables rotation about a longitudinal axis of the truss;

a first mold template having a solid tool of a first shape;

a second mold template having a solid tool of a second shape different that the first shape, wherein the first mold template is mounted on a first side of the truss, and the second mold template is mounted on the first side of the truss adjacent the first mold template along the longitudinal axis.

9. The system of claim 8, wherein the first shape is substantially rectangular and the second shape has a first end that is substantially rounded and a second end that is substantially pointed.

10. The system of claim 8, wherein the first shape is configured for forming a wing section and the second shape is configured for forming an aileron.

* * * * *